UNITED STATES PATENT OFFICE.

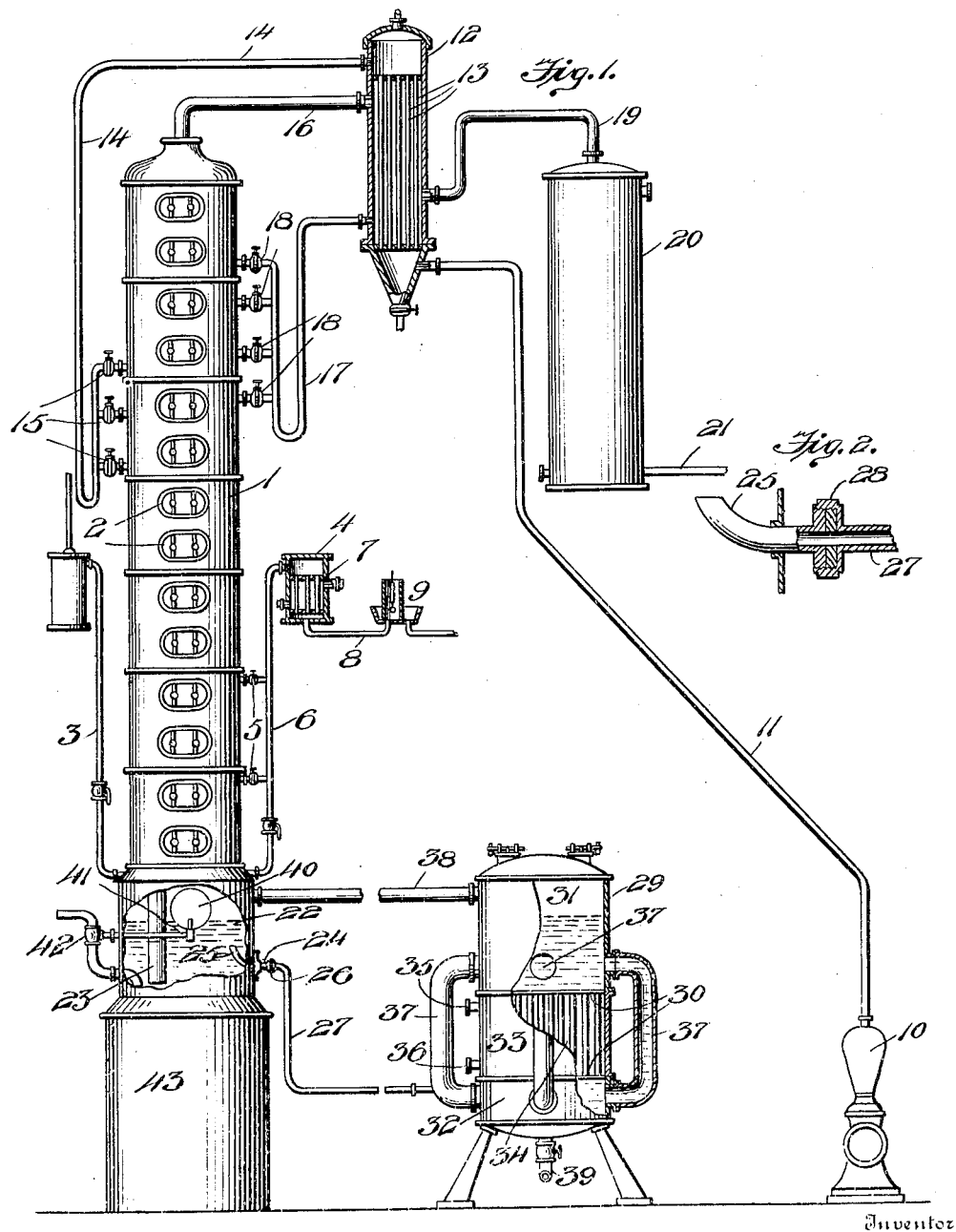

HARRY O. CHUTE, OF CLEVELAND, OHIO.

PROCESS OF DISTILLATION.

No. 896,435.

Specification of Letters Patent.

Patented Aug. 18, 1908.

Application filed December 19, 1907. Serial No. 407,142.

*To all whom it may concern:*

Be it known that I, HARRY O. CHUTE, a citizen of the United States, residing in the city of Cleveland, county of Cuyahoga, and State of Ohio, have invented a certain new and useful Process of Distillation; and I do hereby declare the following to be a full, clear, and exact description of the same, such as will enable others skilled in the art to which it appertains to make and use the same.

This invention relates to processes of distillation and consists in a method of distilling complex liquids to regain fractions of different boiling point, said method comprising the vaporization of a selected portion of the high boiling constituent freed from the low boiling constituent to furnish heat to evaporate and distil off low boiling fractions of such complex liquid and said method being particularly applicable to the products of the destructive distillation of wood and similar liquids containing tar or other solids or semi-solids which tend to settle out of the liquid being distilled; all as more fully hereinafter set forth and as claimed.

In the destructive distillation of wood, the condensed product consists in part of a watery liquid usually called "pyroligneous acid", or "pyroligneous liquor" containing acetic and other acids, methyl alcohol, acetone, and other volatile bodies together with more or less tar held in solution or suspension in the watery liquid by the solvent influence of the stated substances. The methyl alcohol, which boils at 66° C. and the acetone, or "methyl acetone", which boils at 56° together with sundry other low-boiling constituents in less amount, when regained from this liquid constitute the wood alcohol of commerce. In distilling off wood alcohol from the crude pyroligneous acid in the ordinary apparatus and by the ordinary methods used in fractional distillation, the wood alcohol is found to carry with it considerable acetic and other acids, this being particularly the case if the distillation is conducted by the introduction of free steam into the apparatus. If the distillation be conducted by coil steam, the tar which separates from the liquid as the volatile solvents forming the wood alcohol leave the mixture, deposits on the heating elements and bakes there, rendering very frequent cleaning necessary and militating against the efficiency of the operation. This tar separates in the form of very fine globules requiring some time to deposit.

In another application, filed Dec. 3, 1904, Serial Number, 235,280, I have described a method and means of accomplishing a fractional distillation of pyroligneous acid to recover wood alcohol in which the pyroligneous acid is passed downward through a continuously acting column still against an ascending current of vapors generated from a selected portion of the alcohol-free liquid, which serve to afford the heat necessary for distillation, until it is free from alcohol when it reaches an unheated comparatively large settling and quieting chamber in the base of the still where it remains at rest in comparatively large volume while the separated tar settles out. In this body of liquid, the top is more or less disturbed by incoming alcohol-freed liquid from the still above while at the base tar accumulates. I therefore draw off a portion of the alcohol-freed liquid from a midportion of such body below the point where it is disturbed and above the point where the settling tar accumulates, run the selected portion into a separate heater where it is boiled by steam coils or other means, and return the vapors generated into the top of the settling chamber above the normal level of the liquid therein to serve to furnish heat to the column still above. In the prior application, I have elected to claim an apparatus suitable for use in this method while the present application relates to such method.

The described method, while particularly suitable in treating pyroligneous acid and similar tarry liquids, is also adapted for treating other liquids which deposit solids and semi-solids. In distilling alcohol from grain such as corn and rye there are solid substances of a slimy nature which are very liable to precipitate on coils or other heating members, so that it is desirable to remove from the still the portion from which the alcohol has been extracted and remove these insoluble solids by filter pressing, returning to the vapor generator or boiler the clear portion or filtrate. For distilling such grain alcohol and many other liquids the described method has the further advantage of performing the distillation wholly by the vapors of the liquid under treatment without introduction of steam to dilute such liquid or to impart an oily taste to liquid and distillate. In distilling ordinary alcoholic liquids where taste and flavor are important this is quite an advantage. Steam usually imparts flavor and odor to the alcoholic products and the use of coil steam in relations where separated solids can settle on a coil and bake there is disadvantageous for similar reasons. By withdrawing a selected portion of settled and quieted liquid and using it to generate heating vapors, clean flavored products are obtained. The process is, however, especially well adapted to the liquids which separate tar and similar bodies.
In distilling fermentation products there are in addition to the grain or ethyl alcohol, frequently small portions of other delicate compounds such as aldehydes, esters, etc., which are very important as being, or on ageing producing, flavors of great value. These products are in some cases broken up by heat if placed in a pot still or the kettle of an ordinary column still, but by being introduced and volatilized near the top of the continuous column where the temperatures are low they are thus preserved while the selected portion being free of volatile constituents may be heated to a temperature necessary to produce the vapors without any damage to the quality of the distillate.
In the accompanying illustration I have shown, somewhat diagrammatically, apparatus capable of use in performing the described process.
In this showing:—Figure 1 shows the apparatus as a whole, partly in elevation and partly in vertical section; and Fig. 2 is a detail view showing an adjustable joint.
In this showing, 1 designates the column still proper as a whole. The internal construction (not shown) may be of any of the ordinary types. The still is however, provided with numerous manholes, 2, allowing free access to all the cups and shelves or other fractionating devices used, this being substantially necessary to operating on tarry liquids like pyroligneous acid.
3 designates a pipe communicating with a pressure gage of familiar form for indicating pressure, and, therefore, the temperature, at the base of the still.
4 designates a testing device connected with the still at a plurality of points 5 by pipe 6. Vapors which may be drawn off from various points along the height of the still passed through water cooled condenser 7, and condensed liquid flows through pipe 8 into hydrometer cup 9. By the indications of this hydrometer, the richness in alcohol of the vapors at various points in the still may be ascertained and the working of the still controlled. Liquid enters through pump 10 and pipe 11 into heat interchanger 12 (shown in section) where it passes through tubes 13 bathed by vapors from the still, being thereby heated and serving to condense out low-boiling fractions from said vapors for return to the still. From the heat interchanger, the liquid passes through pipe 14 connected to the still at a plurality of points 15 (three such connections are shown), giving the operator the opportunity to introduce it at a point where the liquid on the plate of the still is of about the same average alcoholic richness as said ingoing liquid. The liquid goes down through the still and is fractionated and refractionated in the well understood manner, the alcoholic vapors produced leaving the still at its head through pipe 16 and passing to and through the heat interchanger. Such portion as is condensed in the interchanger is returned through pipe 17 connected to the still at a plurality of points 18 at different heights. Uncondensed, rich vapors leave the heat interchanger through pipe 19 and pass to and through condenser 20, leaving by pipe 21.
The column still is mounted on a settling and quieting chamber 22, of comparatively large capacity. This chamber is unheated and has free vapor connection with the base of the column still proper while liquid flows from such base downwardly to a point near the bottom of the chamber through pipe 23. By this arrangement, the top layers of liquid in the chamber may remain undisturbed and quiet to permit settlement of tar and other insoluble bodies. As there will commonly, however, be more or less floating matter, the uppermost layer of liquid in the chamber is not usually so clear and pure as a layer somewhat below the top of the body but well above its bottom.
A selected portion of the liquid in the chamber, clarified by quiet settling, is drawn off and used to furnish vapors for heating the column still. For this purpose, the chamber is provided at a point well above its bottom with an adjustable tapping pipe 24, this pipe within the chamber having a bent portion 25 and without the chamber having a connection 26, (shown in more detail in Fig. 2), on which it may be freely turned. By turning the pipe more or less, any desired layer of liquid within the quieting and settling chamber may be tapped off. As shown, this pipe is provided with a flange at its outer end meeting a similar flange on a stationary pipe 27 and also has an annular cap, 28, rigid with the first flange and covering it and the second flange, behind which latter it is provided with an annular flange. With this construction and suitable packing it is obvious that the tapping pipe may be freely turned on its axis while still preserving a tight joint.
The stationary pipe (27) communicates with a boiler, indicated as a whole by 29, of special construction. Its body is divided by tube sheets 30 into upper and lower liquid chambers, 31 and 32, and an intermediate heating chamber 33, through which communication is afforded by tubes 34. Around these tubes, steam is circulated by means of inlet 35 and outlet 36, thereby boiling the liquid in the tubes. To permit the necessary circulation in this boiler, comparatively large, air-cooled external pipes 37 are provided, connecting the upper and lower liquid chamber. Into one of these circulation pipes, the liquid supply pipe (27) is tapped. The vapors generated in the boiler leave it through pipe 38 and enter the settling chamber at a point well above the normal liquid level therein, from the chamber of course passing upwards into the column still. The boiler is provided with clean-out tap 39.

To preserve the normal liquid level in the settling chamber, the latter is provided with a float 40, operating in its rising and falling to revolve valve-stem 41 operating a valve in a draw-off pipe 42. This pipe communicates with the base of the settling and quieting chamber and serves to remove accumulating tar and liquid, the amount of liquid sent to the boiler being of course but a fraction of that which enters the quieting chamber. As there is plus pressure in the still, whenever the valve float tends to rise liquid is discharged through this draw-off pipe. The liquid and vapor spaces in the settling chamber and the boiler having free intercommunication, the same liquid level will prevail in both. The settling chamber is shown as mounted on a support 43 which may be masonry or other suitable foundation.

The operation of the device shown is believed apparent from the foregoing. The liquid descending from the column still enters the body of liquid in the quieting chamber near its base so as not to disturb said body. Heavy insolubles, like tar, settle to the bottom of the body and floating insolubles rise to its surface while a selected portion of the clarified liquid is drawn off to furnish vapor to heat the still, the residue of the liquid equivalent to that flowing in is drawn off at the base of the body, carrying with it settled matters. This portion tapped off at the base is of course much larger in amount than the portion tapped off above it to feed the boiler, and the bulk of the liquid descending from the column still flows off with said first portion, so that the body of the liquid is given ample time and opportunity for settling and clarification.

In the ordinary distillation of fermented spirituous liquors by the pot still method, the tailings contain, frequently, what has been described as a waxy or oily substance of a disagreeable and persistent odor, which persists even in the aged product. By distilling in the method above described, this waxy or oily substance does not appear in the distillate and therefore the quality of the product is superior to that made by the pot still method.

The apparatus above described is described and claimed in my application for Letters Patent filed December 3, 1904, Sr. No. 235,280, in which application the process of distillation above described is also substantially described.

What I claim is:—

1. The process of separating wood alcohol and pyroligneous acid which consists in passing crude pyroligneous liquor through a continuously acting chambered column still and generating sufficient vapor from a selected portion of the liquor to distil off the alcohol.

2. The process of distillation which consists in passing a complex liquid through a column still, settling and quieting the low boiling fraction from the base of the still as a body of liquid to permit insolubles to settle, withdrawing a selected portion of the clarified liquid from above the base of such body, converting said selected portion into vapor and returning the vapor to the column still to furnish heat for distillation.

3. The process of distilling pyroligneous acid which consists in passing pyroligneous liquor downward through a chambered column still against an ascending current of vapor to distil off wood alcohol, permitting alcohol-freed liquid from the base of the still to settle as a body in a quieting chamber to deposit tar, drawing off a selected portion of such alcohol-freed liquid at a point below the top and above the bottom of such body, converting such selected portion into vapor and returning the vapors to the still to distil off wood alcohol.

4. The process of distilling which consists in passing a complex liquid through a continuously acting column still, withdrawing a selected portion from the lower chamber of the still, converting said selected portion into vapor and returning this vapor to the column still to furnish heat for distillation.

In testimony whereof I affix my signature, in the presence of two witnesses.

HARRY O. CHUTE.

Witnesses:
H. M. MARBLE,
FRANK E. RAFFMAN.